Oct. 21, 1958 — W. S. WEST — 2,857,066
TRANSPORTING DEVICE

Filed Oct. 19, 1954 — 2 Sheets-Sheet 1

INVENTOR.
BY WILLIAM S. WEST

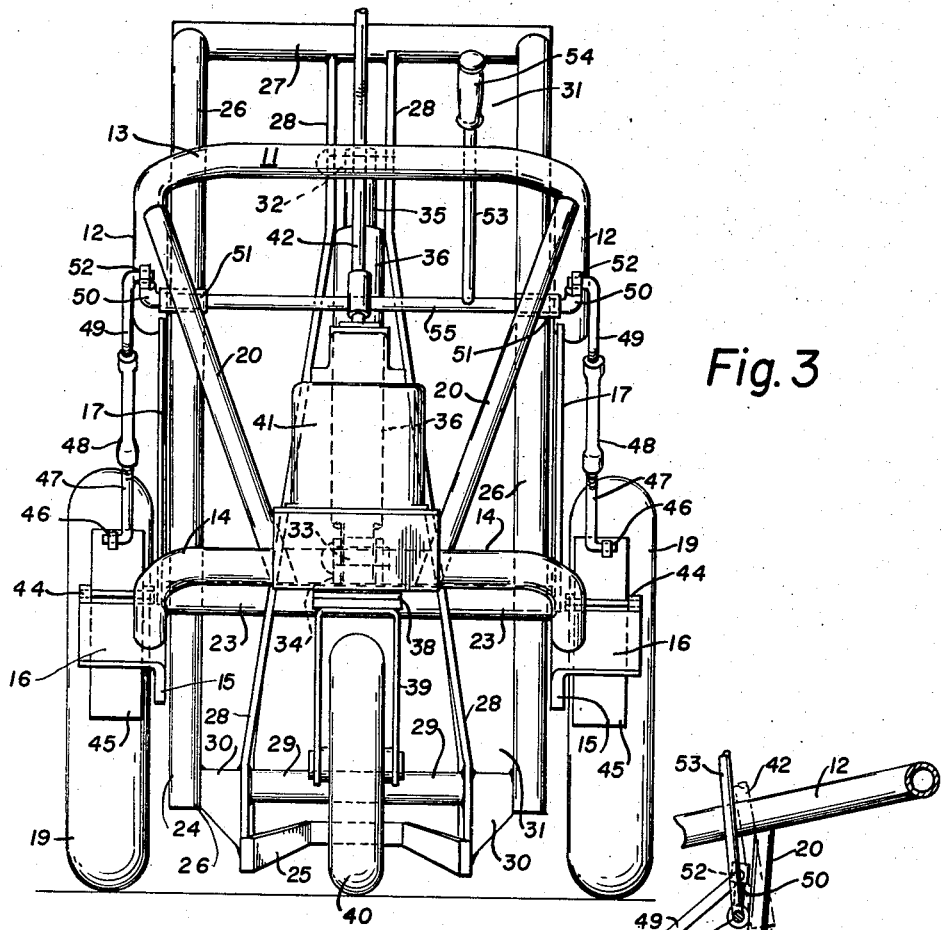

United States Patent Office 2,857,066
Patented Oct. 21, 1958

2,857,066

TRANSPORTING DEVICE

William S. West, Cleveland, Ohio

Application October 19, 1954, Serial No. 463,180

3 Claims. (Cl. 214—707)

My invention relates to transporting devices such as lift trucks used for carrying a load on a pallet.

The present invention is related to and constitutes an improvement upon the lift truck disclosed in United States Patent No. 2,681,712, issued June 22, 1954.

An object of my invention is to provide an improved transporting device for a lift truck providing improved means for accommodating the load being transported.

Another object is the provision of means in a lift truck for automatically tilting the load carried by the lift truck upon raising the load relative to the lift truck.

Another object is the provision for automatically tilting the lifting device carried by the frame of a lift truck upon the raising of the lifting device to a load-transporting position.

Another object is the provision for providing safety in the use of a transporting device and in preventing the load carried thereby from shifting during movement of the transporting device.

Another object is the provision of an improved lift truck which, upon raising the load preparatory to moving the load, also tilts the load backwardly against the back rest and thus holds it in safe position.

Another object is the provision of an improved braking mechanism on a lift truck having tires of rubber-like material and of resilient nature.

Another object is the provision for safely setting the brakes on such a lift truck while providing for the easy manipulation of the brakes.

Another object is the provision of a braking mechanism which takes advantage of the resiliently expandable nature of pneumatic rubber tires for the locking of the brakes in braking position.

Other objects and a fuller understanding of this invention may be had by referring to the following description and claims, taken in conjunction with the accompanying drawings, in which:

Figure 1:
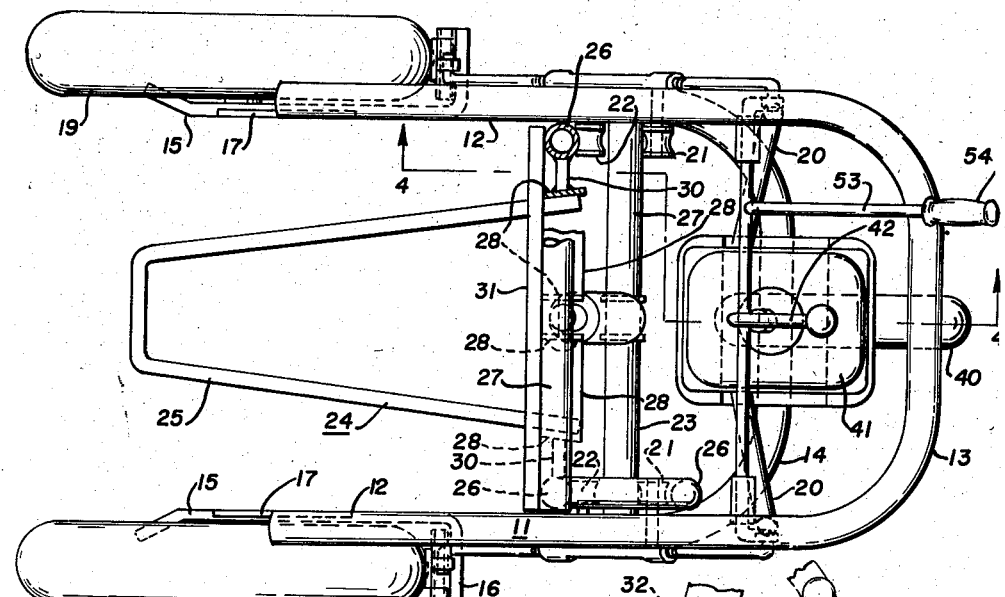
Figure 1 is a plan view looking down upon a transporting device or lift truck embodying my invention, with a portion cut away to better illustrate the parts.
Figure 2:
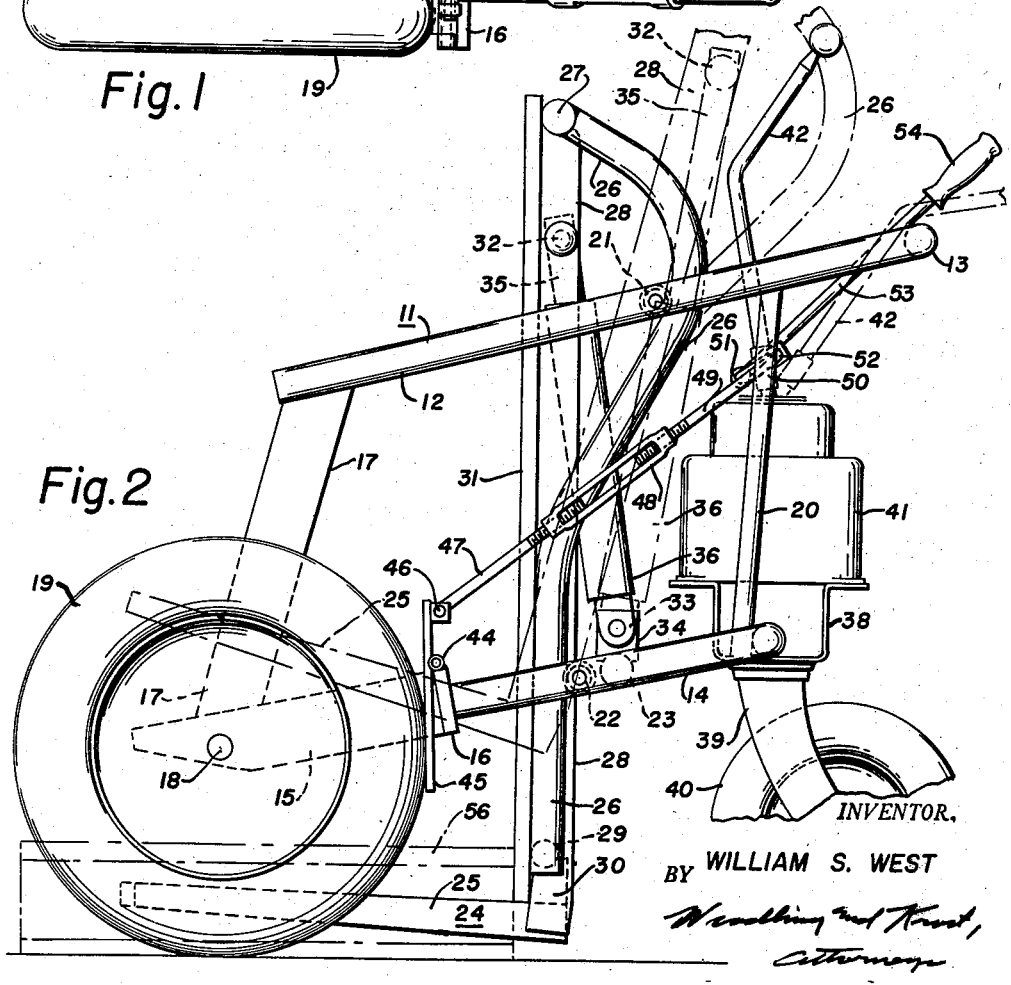
Figure 2 is a side view of the device shown in Figure 1.

Figure 3 is a rear view of the device shown in Figures 1 and 2 and looking toward the left in Figures 1 and 2; and Figure 4 is a partial view taken through the line 4—4 of Figure 1.

My transporting device or lift truck has a frame denoted generally by the reference character 11. The frame 11 has a pair of upper side arms 12 made of steel tubing formed generally in the shape of a U, the base of the U being denoted by the reference character 13.

The frame 11 also has a pair of spaced lower arms 14 arranged in a U-shape and disposed below, and generally parallel to, the upper side arms 12. There are a pair of diagonally disposed upright brace pieces 20 extending from near the rear end of lower arms 14 upwardly to the upper side arms 12. The members 12, 13, 14 and 20 are of steel tubes suitably welded together.

Welded to the forward ends of the two spaced lower arms 14 are wheel mounting extensions 15. These extensions 15 are generally parallel to each other and have angularly disposed portions 16 abutting and welded to the forward ends of the arms 14.

Connecting the forward ends of the upper arms 12 and the extensions 15 are two bars or strips 17. The bars or strips 17 are welded to the arms 12 and to the extension 15 to provide a rigid connection therebetween. Suitably journalled on axle shafts 18 are two spaced forward wheels 19. Each of the wheels 19 is suspended on an independent axle shaft 18 so as to leave an open bay between the extensions 15 supporting the wheels. By reason of the U-shape of the frame and the independent mounting of each forward wheel, there is an open space or bay provided between the upper and lower side arms of the frame for accommodating a load.

Each of the wheels 19 has mounted thereon a pneumatic tire of rubber-like material and of a nature which is resiliently compressible and expandable. Upon being compressed in a radially inward direction, each tire exerts an opposing radially outward force in the usual manner of a resilient tire of rubber-like material of pneumatic or semi-pneumatic construction.

There are a pair of upper rollers 21 journalled upon the upper side arms 12, the two upper rollers 21 being arranged on a common axis. There is also a pair of lower rollers journalled on the lower side arms 14, the rollers 22 being arranged on a common axis. It is to be noted that the pair of rollers 21 are disposed in a vertical plane somewhat rearwardly from a vertical plane passing through the axis of the lower rollers 22, as seen, for example, in Figure 2.

Rearwardly of the lower rollers 22 and extending between the two side arms 14 is a cross piece 23 welded to the arms 14 and also made of tubular steel.

To raise a load, such as a load on the pallet, denoted by the reference character 56 in Figure 2, there is provided a lifting device denoted by the reference character 24. The lifting device 24 is positioned within the open bay or space within the frame 11 and its function is to raise a load upwardly from the ground or other supporting surface so that the welded frame may transport the load to a desired location.

The lifting device 24 has a platform or finger portion 25 disposed generally in a horizontal plane. The platform member 25 is welded to the lower ends of a pair of bar strips 28 extending downwardly at the rear of the open bay. A pair of end plates 30 disposed in a horizontal position are welded to the lower ends of the strips 28 and to the rear of the platform member 25. A cross-rod 29 also welded to the strips 28 extends between the lower ends of the strip 28 generally in the line of the end plates 30 and a little above platform member 25. Welded to the outer ends of the plates 30 and thus rigidly secured to the two spaced strips 28 and to the platform member 25, are two upright rods or guiding members 26. These rods or guiding members near the lower ends thereof, extend generally in a vertical direction but intermediate their ends are curved to form the contour shown in the drawings and particularly in Figure 2. The forward edge surfaces of the two spaced rods or guiding members 26 provide a contour or guiding surfaces adapted to rollingly engage the upper rollers 21. The two lower rollers 22 are positioned to rollingly engage the rear edge surfaces of the two rods 26. The upper ends of the two spaced rods or guiding members 26 are joined by a horizontal member 27 welded thereto.

Extending between the upper horizontal member 27 and the lower cross rod 29, and in advance of the spaced rods 26, is a back board or vertical rearward member 31. This back board 31 is adapted to be engaged by a load upon the platform portion 25 on any tilting of the lifting member 24 or upon any other lateral shift of the load, such as a load of bricks, upon a pallet 56 supported on the platform member 25.

The upper ends of the long strips or bars 28 converge somewhat as they extend upwardly and near their upper ends are parallel to each other. The upper ends of the strips 28 are welded to the top horizontal member 27. It is therefore seen that the lifting device 24, including the two curved rods 26, the top horizontal bar 27, the two strips or bars 28, the platform member 25, the plates 30, the bottom cross-rod 29, and the back rest 31, all move upwardly and downwardly as a unit in the open bay of the frame 11.

Mounted upon the cross piece 23 of the frame is a pivot mounting 34. A cross pin 33 thereon pivotally mounts a cylinder unit 36 so as to tie the cylinder 36 to the frame but to permit the swinging of the cylinder unit 36. A piston stem 35, extending from a piston in the hydraulic cylinder 36 and extending upwardly therefrom, is pivotally connected to the two strips 28 by a cross pin 32. Admission of fluid under pressure into the cylinder unit 36 causes extension of the piston stem 35 and the raising of the lifting member 24. Release of the fluid from the cylinder 36 causes the lifting device to lower by its own weight and to thus retract the piston stem 35. The lowermost position of the lifting member 24 is shown in full lines in the several views of the drawings. The raised position of the lifting device 24 is shown in broken lines in Figure 2. Here it will be seen that the curvature of the guiding members or curved rods 26 engaging the two pairs of rollers 21 and 22 causes the lifting device to tilt rearwardly as it is raised upwardly. Upon downward movement, the lifting device 24 shifts to its horizontal position in which the platform member is generally horizontal. By this automatic tilting of the lifting device, a load carried on the lifting device automatically has its weight shifted back towards the back rest 31 and thus tends to prevent the load from falling forwardly off of the lifting device while it is being transported. This provides for greater safety and convenience in the use of the device.

Weldably secured to the rear end of the lower arms 14 where the arms bend around is a platform bracket 38. Pivotally mounted to this platform bracket 38 is a forked wheel mounting 39. A tire 40 is journalled upon the forked mounting 39. The mounting is such that the wheel 40 may freely swivel as the frame is wheeled about. The wheel 40 also has a resilient pneumatic tire of rubber-like material mounted thereon.

Mounted upon the top of the platform bracket 38 is a pump and valve unit 41. Extending upwardly upon the unit 41 is a pump and valve handle 42. Movement of the handle in the appropriate manner provides hydraulic pressure to be supplied to the cylinder 36 through a suitable conduit. Manipulation of the handle 42 also moves the valves of the unit 41 so that fluid under pressure is either admitted to the cylinder 36 or fluid is released from the cylinder 36 to permit retraction of the piston stem 35. The pump and valve unit with the cylinder and piston provides an appropriate mechanical-advantage means by which the lifting device 24 is raised and lowered so as to raise and lower a load upon platform 25.

The invention also includes suitable safety means for applying brakes to the carrier and for maintaining the braking action as desired. A pair of brake members or plates 45 are pivotally carried on the portion 16 of the extensions 15 in such a manner that the members 45 may swing toward and away from the tire tread of the two spaced wheels 19. The upper ends of the members or plates 45 at a distance above the pivot 44 are connected by pins 46 to rods 47, respectively. Each rod 47 is coupled to an aligned rod 49 by means of an adjusting buckle or member 48. The leverage provided by the arrangement shown better in Figure 2, is such that upon rearward movement of the rods 47 and 49, the lower end of the braking members 45 are forced against, and radially inwardly of, the tire treads of the wheels 19. Forward movement of the rods 47 and 49 retracts the braking members away from the wheels and thus to release the brakes and stop further braking action.

To exert a maximum of force upon the braking members and to also provide for maintaining them in braking operation, there is provided a toggle structure and operation. To provide for this toggle, short links 50 are pivotally connected, respectively, to the upper ends of the rods 49 by means of movable pivots 52. The other ends of the short links 50 are pivotally carried by the fixed or stationary pivots 51. The said other ends of the short links 50 are integrally connected to and carried by a cross bar 55 disposed in a horizontal plane. Rocking of the cross bar 55 by means of a actuating rod 53 revolves the short links 50 to operate the rods 49 in the usual toggle arrangement. A handle 54 is provided on the end of the actuating rod 53 to facilitate the use of the braking mechanism.

It will be noted that when the brakes have been applied so as to place the braking mechanism and associated rods in the position shown in Figure 2, the rubber tires on the wheels 19 are resiliently compressed. By reason of the nature of the tires, the tires exert an equal and opposing force to press the braking members 45 radially outward of the wheels. This opposing force is transferred to the toggle arrangement so that it tends to lock the toggle arrangement into the position of Figure 2 and thus to maintain the braking action upon the wheels. Only by exerting enough manual force on the rod, may this opposing force be overcome and the brake released. Upon releasing of the brake, the toggle arrangement assumes the position of the parts shown in Figure 4.

It will thus be seen that there is here presented an improved carrier having improved safety features which aid in properly carrying the load in a convenient and safe manner, and also in which there is provided a proper economical and efficient manner of locking the carrier in a stopped or braked condition.

The present disclosure includes that contained in the appended claims, as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A carrier comprising in combination a frame rollingly movable along a surface, said frame having an upper portion and lower portion and defining an open bay at the forward end of the carrier, a first pair of rolling elements carried by said upper portion, a second pair of rolling elements carried by said lower portion, a lifting device carried by said frame and located in said open bay, said loading device having a load-carrying portion extending forwardly in said open bay and having a back-rest portion disposed at substantially right angles to the load-carrying portion and extending upwardly therefrom, elevating means connecting said frame and said lifting device for elevating said lifting device relative to said frame, and a guiding member carried by, and movable with, said lifting device, said guiding member being in rolling engagement with said first and second pairs of rolling elements to guide the movement of said lifting device, said guiding member having a contour portion displaced from a substantially vertical plane, and engageable by said first pair of rolling elements to vary the angular disposition of the loading device relative to said vertical plane upon the elevation of the loading device relative to the frame by said elevation means.

2. A carrier comprising in combination a frame rollingly movable along a surface, said frame having spaced side portions defining an open space, a lifting device carried by the frame and movable up and down in said open space, elevating means carried by the frame for elevating said lifting device, roller means carried by said frame in fixed locations at a plurality of elevations, guide means carried by said lifting device to move therewith in rolling engagement with said roller means to guide the up and down movements of the lifting device, said guide means having a contour substantially deviating from a straight vertical plane and arranged to tilt said lifting device rearwardly upon upward movement of said guide means along said roller means.

3. In combination, a wheeled frame having forwardly extending and spaced-apart arms adapted to embrace a load to be transported, a lifting device carried by said frame and movable up and down relative to said frame, said lifting device having a platform portion adapted to support said load, mechanical-advantage means carried by said frame for raising said lifting device relative to said frame, roller means and guide means engaging said frame and lifting device for rollingly guiding the up and down movement of said lifting device relative to said frame, said guide means comprising a pair of spaced frame members extending upwardly from said platform portion and movable with the lifting device in said up-and-down movement, said roller means including a plurality of rollers journaled on said frame at spaced elevations to engage the guide means at a plurality of elevations, said guide means including a contour surface engageable by said roller means and arranged to vary the angularity of the lifting device relative to the frame during said up and down movement.

References Cited in the file of this patent

UNITED STATES PATENTS

| | | |
|---|---|---|
| 767,299 | McDonald | Aug. 9, 1904 |
| 1,012,713 | Russell | Dec. 26, 1911 |
| 1,170,638 | Hofstrand | Feb. 8, 1916 |
| 1,426,116 | Simons | Aug. 15, 1922 |
| 2,558,917 | Woodward | July 3, 1951 |
| 2,560,131 | Sasgen et al. | July 10, 1951 |
| 2,681,712 | West | June 22, 1954 |